United States Patent [19]

Komatsu

[11] Patent Number: 4,585,104
[45] Date of Patent: Apr. 29, 1986

[54] CLUTCH DISK FOR A CLUTCH AND METHOD OF TREATING A FACING OF A CLUTCH

[75] Inventor: Hiroshi Komatsu, Hachioji, Japan

[73] Assignee: Fuji Jukogyo Kabushiki Kaisha, Tokyo, Japan

[21] Appl. No.: 415,765

[22] Filed: Sep. 7, 1982

[30] Foreign Application Priority Data

Sep. 8, 1981 [JP] Japan .................................. 56-141946

[51] Int. Cl.[4] ................................................ F16D 69/02
[52] U.S. Cl. ............................. 192/70.14; 192/107 M; 427/11
[58] Field of Search ........................ 192/107 M, 70.14; 188/251 M; 427/11

[56] References Cited

U.S. PATENT DOCUMENTS

| 2,149,253 | 3/1939 | Cooper | 427/11 |
|---|---|---|---|
| 2,464,437 | 3/1949 | Dasher | 192/107 M X |
| 3,553,007 | 1/1971 | Hennig | 427/11 |
| 4,105,473 | 8/1978 | Anderson et al. | 427/11 X |
| 4,110,512 | 8/1978 | Roy et al. | 427/11 X |
| 4,171,297 | 10/1979 | Hosaka | 252/394 X |
| 4,275,835 | 6/1981 | Miksic et al. | 206/20.5 X |

FOREIGN PATENT DOCUMENTS 2264275  7/1974  Fed. Rep. of Germany ... 188/251 M

Primary Examiner—Rodney H. Bonck
Attorney, Agent, or Firm—Martin A. Farber

[57] ABSTRACT

A clutch disk for a clutch used in an automobile having facings on both sides thereof. The facing is made of sintered steel with a porous structure. A rust preventive is impregnated in the facing. The rust preventive is dicyclohexylammonium nitrite.

12 Claims, 5 Drawing Figures

CLUTCH DISK FOR A CLUTCH AND METHOD OF TREATING A FACING OF A CLUTCH

BACKGROUND OF THE INVENTION

The present invention relates to a clutch for vehicles, and more particularly to a clutch disk for a clutch used in an automobile, in the clutch disk a rust preventive is impregnated.

There is a clutch disc having facings which are made of sintered steel. In such a clutch, moisture in the air tends to deposit on the sliding surfaces of the facings of the clutch disk, flywheel and pressure plate of the clutch moistening the surfaces, since these members are located closely to each other with an appropriate gap. Further the moisture inside the clutch of a vehicle hardly evaporates. Accordingly, rust easily forms on the inner parts. The rust formed on the sliding surfaces of the facings and flywheel causes both members to stick to each other and causes problems with the clutch such as failure of disengagement of the clutch if the vehicle is not driven for a long time. Therefore, rust preventives must be provided on the sliding surfaces during manufacturing the automobile to prevent rusting which will occur before it is given to a user.

In a conventional rust prevention method, sodium nitrite is impregnated into the facings of the clutch disk and the surfaces made of iron of the flywheel and pressure plate are kept in a passive state, so that the formation of rust on the surfaces is prevented. In such a clutch disk, a sufficient amount of sodium nitrite must be maintained in the facings to obtain a satisfactory anti-corrosion effect.

However, the rust preventive of sodium nitrite is apt to be removed from the facing by the sliding of the facing on the flywheel during the use of the clutch for the transportation of the automobile before transfer of it to a user. As a result, sufficient rust preventing effect is not expected.

SUMMARY OF THE INVENTION

The object of the present invention is to provide a clutch disk having a sufficient rust preventive effect, even after the clutch is once used and stored for a time.

The present invention will be more apparent from the following description made with reference to the accompanying drawings.

DETAILED DESCRIPTION OF THE PRESENT INVENTION

Figure 1:
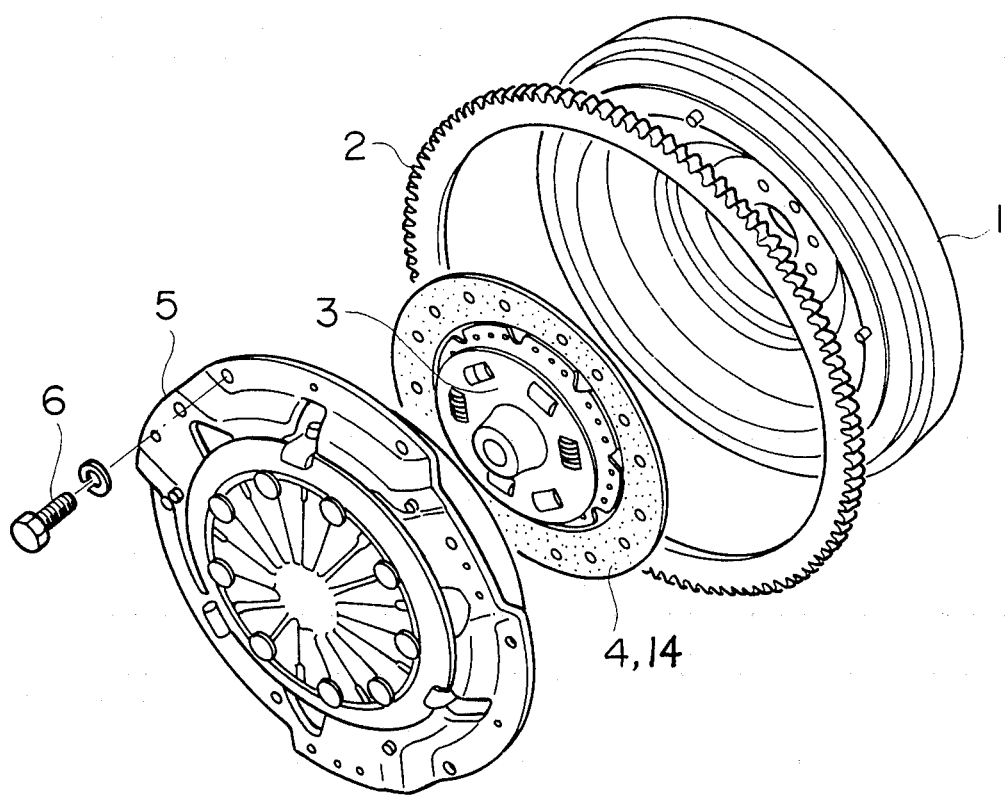
FIG. 1 is an exploded perspective view of a clutch.
Figure 2A:
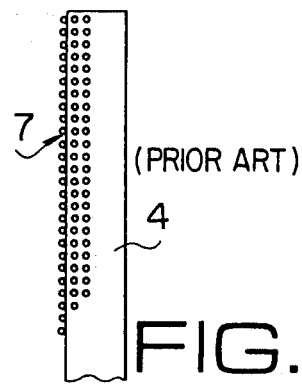
FIGS. 2a and 2b are explanatory broken-away cross-sectional views showing conventional facings.
Figure 2B:
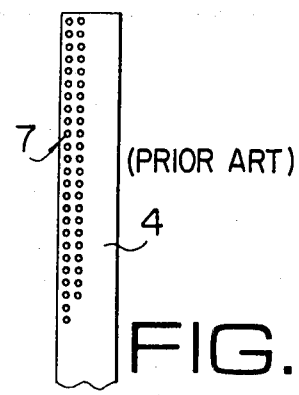

The conventional rust prevention treatment is explained with reference to the attached drawing. In FIG. 1 showing a clutch for an automobile, a flywheel 1 is connected with a crankshaft of an engine (not shown), and a ring gear 2 engaging with a starter (not shown) is fixed to the periphery of the flywheel 3. In the flywheel 1, there is a clutch disk 3 connected with a transmission input shaft and has facings 4 secured to both sides thereof. A pressure plate 5 is further attached to the flywheel 1 by screws 6. Each facing 4 is made of sintered steel in porous structure. FIGS. 2a and 2b show cross sections of one of the facings 4 which is impregnated with sodium nitrite 7. In FIG. 2a, which shows the state before the facing 4 has been used, sodium nitrite 7 appears on the surface of the facing 4. If such facings with sodium nitrite 7 on the surfaces are disposed between the flywheel 1 and the pressure plate 5, are prevented from rusting. However, after use of the clutch for moving the automobile, the surface of the facing 4 wears as shown in FIG. 2b and the sodium nitrite on the surface is removed. Therefore, unless sodium nitrite remaining inside the facing 4 comes out on the surface, rust prevention is not effected. Actually it takes a lot time before the sodium nitrite 7 inside the facing 4 comes on the surface. Therefore satisfactory rust prevention cannot be expected after sodium nitrite 7 has been removed from the surface and the formation of rust will occur on the members of the clutch when the automobile reaches to a user.

The object of the present invention is to seek to eliminate such a drawback of the conventional clutch disk.

Figure 3A:
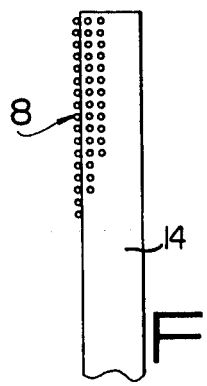
FIGS. 3a and 3b are explanatory views showing facings according to the present invention.

Referring to FIG. 3a showing the facing 14 corresponding to the flywheel 1 according to the present invention, a rust preventive 8 which vaporizes at 200°–300° C. is (as discussed in the next paragraph) is impregnated in the facing 14. The rust preventive is, for example, dicyclohexylammonium nitrite $(C_6H_{11})_2NH_2NO_2$. The facing 14 is submerged in an aqueous solution of dicyclohexylammonium nitrite until it is deeply impregnated into the porous structure of the facing 14 as well as appearing on the surface of the facing 14 as shown in FIG. 3a.

Figure 3B:
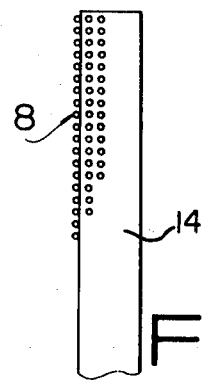

Before the clutch operates, the state of which is shown in FIG. 3a, the rust preventive 8 impregnated in the facing 14 appears on the surfaces of the facing 4. Therefore, the sliding surfaces of the flywheel and pressure plate are prevented from rusting by the rust preventive. When the clutch operates, the facings of both sides of the clutch disk engage with the flywheel 1 and the pressure plate 5 at a pressure about 2 Kg/cm². Although the rust preventive is removed by sliding between these members, friction heat is generated on both of the facings 14. The friction heat raises the temperature to 200°–300° C. and the rust preventive in the facing is vaporized, forming a rust preventive layer on the surface of the facing as shown in FIG. 3b, thereby preventing rusting of the iron. Further, the higher the friction temperature caused by the clutch operation, the more the rust preventive 8 moves to the surface to compensate the loss of rust preventive so as to continuously prevent the rusting. Such a movement of the rust preventive 8 continues until all the rust preventive is exhausted and runs out. A required amount of rust preventive 8 may be impregnated in the facing in accordance with the period required to protect the sliding members.

In accordance with the present invention, a rust prevention film is formed on sliding surfaces of the flywheel 1 and pressure plate 5 to prevent rusting thereof, even if the clutch is used for the transportation of the automobile. Thus, rust prevention can be maintained for a long time.

What is claimed is:

1. A clutch disk for a clutch having iron members and used in a vehicle, the clutch disc being operatively frictionally engageable with the iron members of the clutch so as to raise the temperature to 200°–300° C., comprising a porous metallic facing provided on each side of the clutch disk, the facings respectively engaging with the iron members of the clutch, each of said facings is impregnated with a volatile rust preventive which vaporizes at a temperature of 200°–300° C., such that upon the operative frictional engagement of the facings with the iron members of the clutch the rust preventive inside the facings vaporizes and forms a rust preventive film on the surfaces of the facings preventing rusting of the iron members.

2. The clutch disk for a clutch used in a vehicle according to claim 1 wherein said rust preventive is dicyclohexylammonium nitrite.

3. The clutch disc according to claim 1, wherein the rust preventive is deeply impregnated into the facings as well as appearing on the surfaces of the facings.

4. A method of treating a facing of a clutch having iron members, the clutch disc being operatively frictionally engageable with the iron members of the clutch so as to raise the temperature to 200°–300° C., comprising the steps of making facings of a clutch disc from a porous metallic material, impregnating the facings with a volatile aqueous rust preventive which vaporizes at a temperature of 200°–300° C., and vaporizing the rust preventive inside the facings at a temperature of 200°–300° C. by operatively frictional engaging the facings with the iron members of the clutch causing the vaporized rust preventive to form a film on the surfaces of the facings for preventing subsequent rusting of the iron members when the clutch is disengaged.

5. The method of treating a facing of a clutch according to claim 4 wherein said porous metallic material is sintered steel.

6. The method of treating a facing of a clutch according to claim 5 wherein said rust preventive is dicyclohexylammonium nitrite.

7. The method of treating a facing of a clutch according to claim 4 wherein during the vaporization step said preventive inside the facings continuously moves to the surfaces compensating the loss of the film from the surfaces by rubbing off during the operative frictional engagement of the facings with the iron members.

8. The method of treating a facing of a clutch according to claim 7, wherein the amount of vaporization increases with an increase in the temperature with a corresponding movement of the rust preventive from inside the facings to the surfaces.

9. The method of treating a facing of a clutch according to claim 7 wherein the amount of rust preventive inside the facings corresponds with a predetermined period of operation of the clutch to protect the surfaces.

10. The method of treating a facing of a clutch according to claim 4, wherein a rust preventive film also forms on the surfaces of the iron members by said vaporizing step.

11. The method of treating a facing of a clutch according to claim 3, wherein the rust preventive is deeply impregnated into the facings as well as appearing on the surfaces of the facings.

12. The method of treating a facing of a clutch according to claim 3, wherein the impregnating step is performed by submerging the facings in the aqueous rust preventive.

* * * * *